United States Patent
Koelner

(10) Patent No.: US 9,551,157 B2
(45) Date of Patent: *Jan. 24, 2017

(54) UNIT FIXING INSULATION TO A WALL

(71) Applicant: Koelner Rawlplug IP Sp. z O.O., Wroclaw (PL)

(72) Inventor: Radoslaw Zygmunt Koelner, Wroclaw (PL)

(73) Assignee: Koelner Rawlplug IP Sp. z o.o., Wroclaw (PL)

( * ) Notice: Subject to any disclaimer, the term of this patent is extended or adjusted under 35 U.S.C. 154(b) by 121 days.

This patent is subject to a terminal disclaimer.

(21) Appl. No.: 14/411,230

(22) PCT Filed: Jul. 8, 2013

(86) PCT No.: PCT/PL2013/000089
§ 371 (c)(1),
(2) Date: Dec. 24, 2014

(87) PCT Pub. No.: WO2014/011064
PCT Pub. Date: Jan. 16, 2014

(65) Prior Publication Data
US 2015/0191915 A1    Jul. 9, 2015

(30) Foreign Application Priority Data
Jul. 10, 2012  (PL) .......................................... 399886

(51) Int. Cl.
*F16B 43/00* (2006.01)
*E04F 13/22* (2006.01)
(Continued)

(52) U.S. Cl.
CPC ............. *E04F 13/22* (2013.01); *E04B 1/7633* (2013.01); *F16B 5/01* (2013.01); *F16B 13/124* (2013.01)

(58) Field of Classification Search
CPC ........... E04F 13/22; E04B 1/7633; F16B 5/01; F16B 13/24
(Continued)

(56) References Cited

U.S. PATENT DOCUMENTS 4,452,023 A * 6/1984 Stahlberg .............. E04D 3/3603
411/34
4,987,714 A * 1/1991 Lemke .................. E04D 3/3603
411/369

(Continued)

FOREIGN PATENT DOCUMENTS

DE    10 2006 042052 A1   3/2007
EP        1 693 530 A1    8/2006
(Continued)

*Primary Examiner* — Gary Estremsky
(74) *Attorney, Agent, or Firm* — Cherskov Flaynik & Gurda, LLC

(57) ABSTRACT

The object of the invention is a unit fixing insulation to the wall intended both for styrofoam insulation as well as for mineral wool insulation. A unit fixing insulation to a wall, according to the invention, is formed with the locating sleeve on which a pressing sleeve is slidably mounted, constituting an integral unit with a circular pressing plate provided with slitting teeth arranged along the circumference of a circular plate and the locating sleeve is ended at one end with an expansion zone and at the other end with a circular plate, whereas the locating sleeve houses an expansion element, preferably in the form of a screw. A unit characterised in that the expansion element has a head embedded permanently in the sleeve with an outer thread and a polygonal hole is provided within the sleeve, whereas a pressing plate is ended with a circular flange which houses the insulating cap, while the teeth of the pressing plate have side and front sharp edges.

11 Claims, 2 Drawing Sheets

(51) Int. Cl.
*E04B 1/76* (2006.01)
*F16B 13/12* (2006.01)
*F16B 5/01* (2006.01)

(58) Field of Classification Search
USPC .................................. 411/410, 431; 52/549
See application file for complete search history.

(56) References Cited

U.S. PATENT DOCUMENTS

| | | | | |
|---|---|---|---|---|
| 5,069,589 | A * | 12/1991 | Lemke | E04D 5/145 411/160 |
| 5,171,118 | A * | 12/1992 | Rothenbuhler | E04B 1/762 411/480 |
| 5,378,102 | A * | 1/1995 | Mossman | B25B 21/002 227/140 |
| 6,308,483 | B1 * | 10/2001 | Romine | E04D 3/3603 411/383 |
| 7,320,179 | B2 | 1/2008 | Tiemann | |
| 2005/0055927 | A1 * | 3/2005 | Tiemann | B23B 49/005 52/459 |
| 2008/0085168 | A1 * | 4/2008 | Cabrele | F16B 13/001 411/22 |
| 2011/0008124 | A1 * | 1/2011 | Niklewicz | B25B 31/005 411/80.6 |

FOREIGN PATENT DOCUMENTS

| | | |
|---|---|---|
| EP | 1 693 530 B2 | 7/2013 |
| WO | 2011/012096 A1 | 2/2011 |
| WO | 2011/12096 A1 | 2/2011 |

\* cited by examiner

A-A

UNIT FIXING INSULATION TO A WALL

CROSS REFERENCE TO RELATED APPLICATIONS

This application claims the benefit as a US Nationalization of PCT Application serial number PCT/PL2013/000089 filed on Jul. 8, 2013, published as WO/2014/011064 on Jan. 16, 2014, which in turn claimed priority to a Polish Patent Application serial number, P.399886, filed on Jul. 10, 2012, the contents of which are hereby incorporated by reference.

BACKGROUND OF THE INVENTION

1. Field of the Invention

The object of the invention is a unit fixing insulation to the wall intended both for styrofoam insulation as well as for mineral wool insulation.

2. Background of the Invention

U.S. Pat. No. 7,320,179 discloses a unit fixing insulation to a wall. This unit is formed by a pressing plate with a shaft, which houses a sleeve locating pin which is ended with an expansion zone. A locating pin houses an expansion element in the form of a steel screw with a head at one end and a thread at the other, i.e. from the side inserting in the locating pin, in particular within its expansion zone. The head of the expansion element is adapted for receiving a tip of a drill or drill—screwdriver, which allows screwing the threaded portion of the expansion element into the locating pin expansion zone. A hexagonal nut, to which a metal shield is welded, is applied onto the tip of the drill, wherein the metal shield is positioned at a predetermined distance from the nut, and is connected to it through the shoulders. While the drill tip rotates, the hexagonal nut engages the seat of the pressing plate causing also the rotation of the pressing plate, whose edges are provided with teeth. Teeth of the pressing plate are cutting the insulation until the metal shield rests against the insulation. As a result, a cavity is formed between the outer surface of the pressing plate and the outer surface of the insulation, which has to be provided with additional insulation fitting.

German patent specification DE 10 2006 042 052 also discloses a unit fixing insulation to a wall. This unit is formed by a pressing plate connected with a locating pin which ends with an expansion zone. A locating pin houses an expansion element in the form of a steel screw. A circular insulating fitting with slits in the center is attached to the pressing plate. The fixing unit is inserted in the previously drilled hole, where after a long drill tip is inserted through the circular fitting slits into the locating pin hole. Drill rotations cause screwing the expansion element into the expansion zone of the locating pin.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
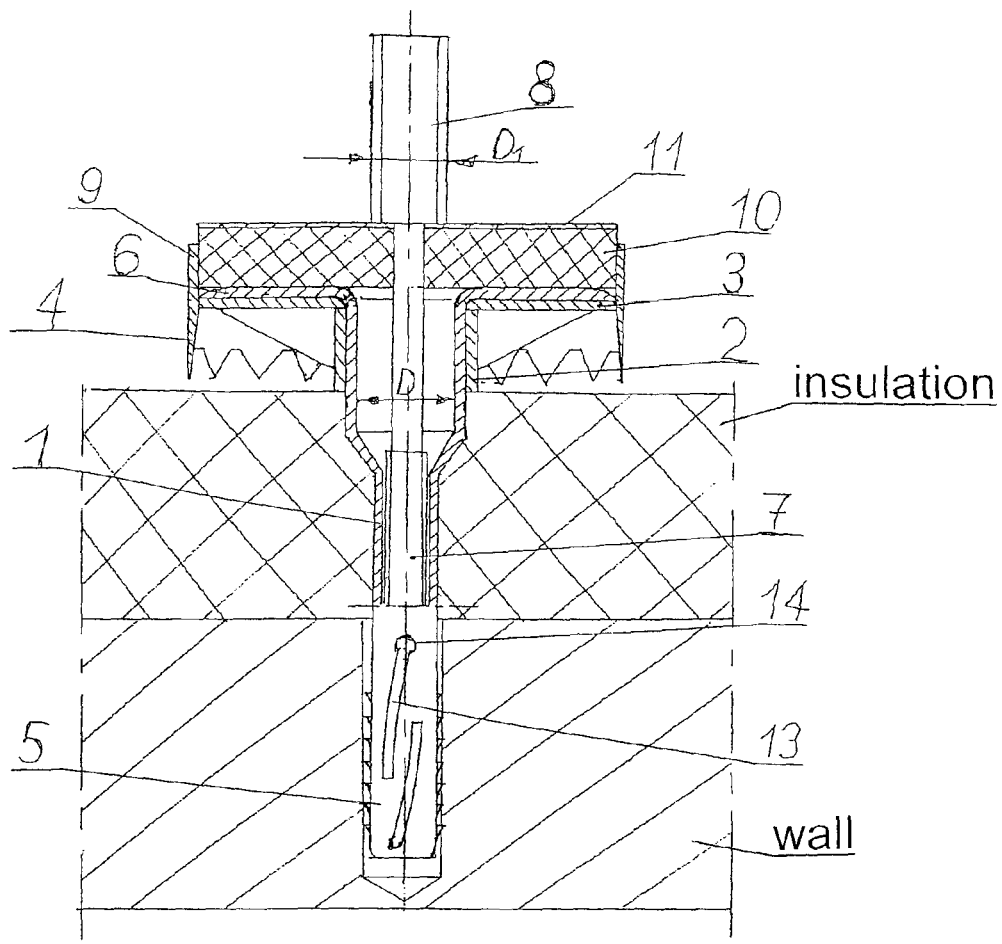
FIG. 1 depicts a cross section of an embodiment of the fixing unit.

The foregoing summary, as well as the following detailed description of certain embodiments of the present invention, will be better understood when read in conjunction with the appended drawings.

A unit fixing insulation to a wall, according to the invention, is formed with the locating sleeve on which a pressing sleeve is slidably mounted, constituting an integral unit with a circular pressing plate provided with the slitting teeth arranged along the circumference of a circular plate. The locating sleeve is ended at one end with an expansion zone and at the other end with a circular plate, whereas the locating sleeve houses an expansion element, preferably in the form of a screw. A fixing unit characterized in that the expansion element has a head embedded permanently in the sleeve with an outer thread and a polygonal hole is provided within the sleeve, whereas a pressing plate is ended with a circular flange which houses the insulating cap, while the teeth of the pressing plate have side and front sharp edges. An insulating cap has centrally located radial slits with a diameter of 10 to 30 mm. An insulating cap has an outer layer in the form of a flock. A locating sleeve has an inner diameter with gradation, wherein a larger diameter is from the inlet side. A larger inner diameter of a locating sleeve is larger than the outer diameter of the sleeve fixedly joined to an expansion element, wherein the length of a larger inner diameter of the locating sleeve is equal to or shorter than the length of the sleeve fixedly joined to an expansion element. The end of a locating sleeve has a ribbed outer surface and slitted on both sides, wherein the outermost slits are ended with a circular opening. The ribs are in the form of teeth facing a circular plate. A length of an expansion element is smaller than a length of a locating sleeve, wherein an expansion zone of the locating sleeve is longer than the length of the threaded sleeve. Teeth front sharp edges are formed from the inner side. The sleeve (8) with an outer thread has an outer diameter with gradation from the side of an expansion element and the size of these diameters is adapted to the inner diameters of a locating sleeve.

A unit fixing insulation to a wall, according to the invention, is characterised by a simple structure and yet a multiple functionality. Application of the unit for fixing the insulation to the wall will cause not only its durable attachment but also its additional advantage is that the fixing is fast, because fixing the unit is obtained during one short operation. Having performed preparatory activities involving drilling the hole and inserting the fixing unit into the hole, a drill tip of the drill-screwdriver is inserted into the hole of the sleeve fixedly joined to an expansion element and after a few rotations of the drill—screwdriver the insulation is fixed to the wall and the wall section is insulated flush with the entire insulation. Simultaneous fixing of the insulation in the form of the fixing unit does not create a thermal bridge, what might cause a heat loss. Fixing of the insulating cap tightly within the peripheral flange is an easy and inexpensive fixing at the same time being a permanent fixing not subject to changes during assembly. Using a special sleeve attached onto the head of the expansion element causes insulating a metal expansion element from the outer surface, which eliminated the thermal bridge, through which the heat could pass to the outside of the wall insulation, while the gradation of its outer diameter, from the side of the expansion element, prevent penetrating of moisture. At the same time the shape of the sleeve allows the use of drill-screwdriver for fixing the fixing unit, and its threaded outer surface is an additional fixing element for the insulating cap. Using special teeth sharp edges causes easy cutting of the wall insulation by the pressing plate and at the same time does not damage the structure of the whole wall insulation. Ending the slits in the locating sleeve with a circular opening causes significant weakening of the cross-section of the locating sleeve, so that while screwing the expansion element it is compressed, which in turn allows free insulation compressing without the need to move the whole locating sleeve.

Figure 2:
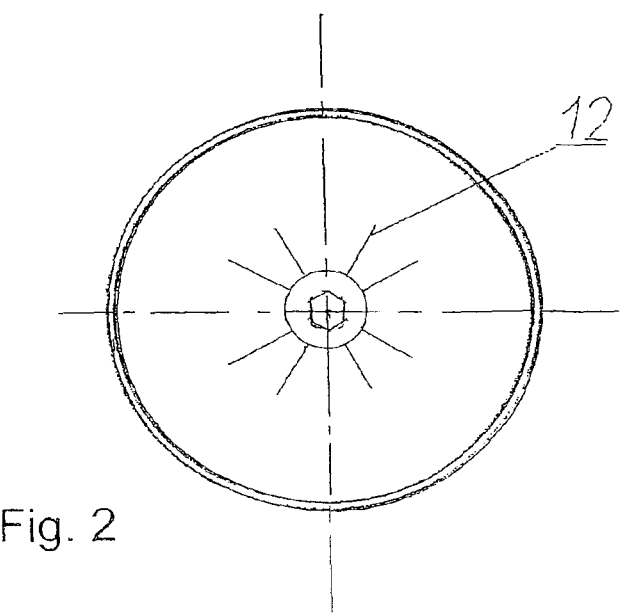
FIG. 2 depicts a top view of the embodiment shown in FIG. 1.
Figure 3:
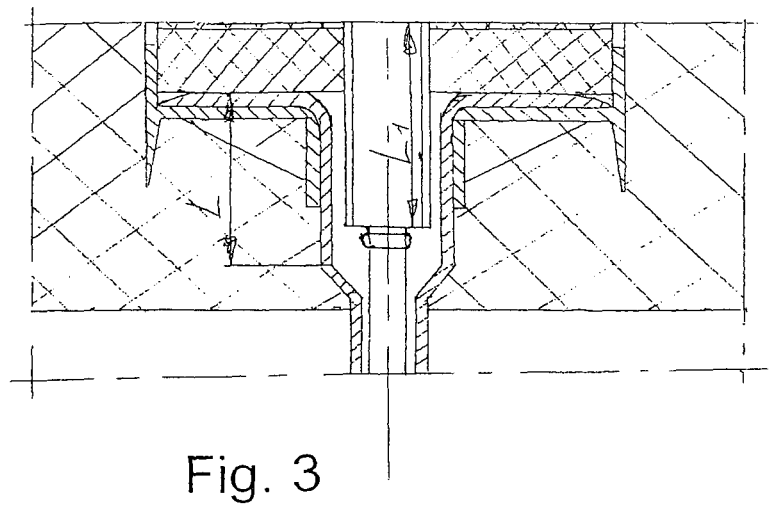
FIG. 3 shows a partial view of an embodiment as installed in insulation.
Figure 4:
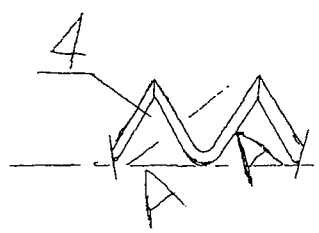
FIG. 4 shows a partial view of an embodiment of the fixing unit.
Figure 5:
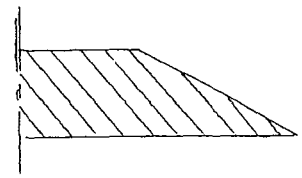
FIG. 5 depicts a cross section of the teeth of an embodiment of the invention.
Figure 6:
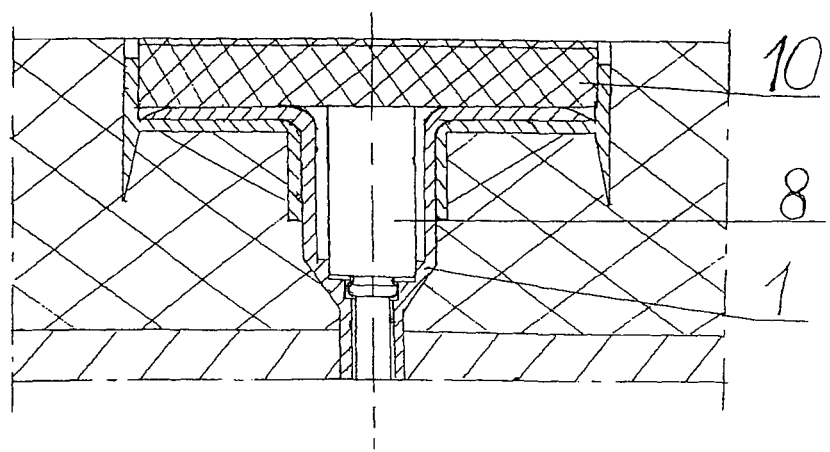
FIG. 6 depicts a view of an arrangement of embodiment components.

The unit fixing insulation to the wall, according to the invention is described in more details in the embodiment and the drawing, in which FIG. 1 shows a cross-section through the fixing unit located in the opening and prepared for being fixed in the insulation, FIG. 2 is the top view of the unit shown in FIG. 1, FIG. 3 shows a fragment of the unit fixed in the insulation, FIG. 4 shows a fragment of the unit teeth, whereas FIG. 5 is a cross-section through the tooth edge, while FIG. 6 shows a variation of the mutual position of the fixing unit elements, wherein the sleeve together with the expansion element are arranged under the insulating cap.

As it is illustrated in FIG. 1 to FIG. 6, the unit fixing insulation to the wall is formed with the locating sleeve 1 on which a pressing sleeve 2 is slidably mounted, constituting an integral unit with a circular pressing plate 3 provided with slitting teeth 4 arranged along the circumference of a circular pressing plate 3. The locating sleeve 1 is ended at one end with the expansion zone 5, while at the other end with the circular plate 6. The locating sleeve 1 houses an expansion element 7, in the form of a screw. The expansion element 7 has a head embedded permanently in the sleeve 8 with an outer thread. A polygonal hole is provided within the sleeve 7. The pressing plate 3 is ended with a circular flange 9 which houses the insulating cap 10. The insulating cap 10 has an outer layer in the form of a flock 11. Moreover, the insulating cap together with the flock 11 have radial slits 12 located centrally with a diameter 35 mm. Slitting teeth 4 of the pressing plate 3 have side and front sharp edges, wherein front sharp edges of the slitting teeth 4 are formed on the inner side. The locating sleeve 1 has a diameter with gradation, wherein a larger diameter is from the inlet side. A larger inner diameter D of a locating sleeve 1 is larger than the outer diameter Di of the sleeve 8 fixedly joined to an expansion element 7, wherein the length L of a larger inner diameter D of the locating sleeve 1 is longer than the length Li of the sleeve 8 fixedly joined to an expansion element 7. The end of a locating sleeve 1 has a ribbed outer surface and slitted on both sides, wherein the outermost slits 13 are ended with a circular opening 14. A circular opening 14 causes weakening of the cross-section of the locating sleeve 1, so that at this weakened place the locating sleeve is expanded while screwing the expansion element 7 into it.

Using the fixing unit is very simple as it consists only in making a hole in the wall and insulation, inserting into this hole a locating sleeve 1 consists of a pressing plate 3 and insulating cap 10, and then inserting the expansion element 7 into the locating sleeve 1 and connecting it with a drill-screwdriver. Screwing the expansion element can be completed in a position shown in FIG. 3, wherein the sleeve 8 connected with an expansion element is arranged flush with the insulating cap 10. It is possible also to complete the screwing of the expansion element 7 in the position shown in FIG. 6, wherein the sleeve 8 is arranged under the insulating cap 10, and its slits converge to form a uniform insulation.

The embodiment of the invention in which an exclusive property or privilege is claimed is defined as follows:

1. A unit for attaching insulation to a wall comprising:
   a main body formed with a locating sleeve on which a pressing sleeve is slidably mounted constituting an integral unit; wherein said unit comprises a circular pressing plate provided with slitting teeth arranged along the circumference of the circular plate;
   wherein the locating sleeve is ended at one end with an expansion zone and at the other end with the circular plate, whereas the locating sleeve houses an expansion element, wherein the expansion element defines a head embedded permanently in a sleeve with an outer thread;
   wherein the locating sleeve defines a polygonal hole; and
   wherein the pressing plate is ended with a circular flange which houses an insulating cap, while the teeth of the pressing plate have side and front sharp edges.

2. A fixing unit according to claim 1, wherein the insulating cap has centrally located radial slits with a diameters of up to 50 mm.

3. A fixing unit according to claim 1, wherein the insulating cap has an outer layer in the form of a flock.

4. A fixing unit according to claim 1, wherein the locating sleeve has an inner diameter with a gradation, wherein a larger diameter is from an inlet side.

5. A fixing unit according to claim 4, wherein that a larger inner diameter of a locating sleeve is larger than the outer diameter of the sleeve fixedly joined to the expansion element, wherein the length of a larger inner diameter of the locating sleeve is equal to or shorter than the length of the sleeve fixedly joined to an expansion element.

6. A fixing unit according to claim 1, wherein an end of the locating sleeve has a ribbed outer surface and slits on both sides, wherein outermost slits are ended with circular openings.

7. A unit according to claim 6, wherein the ribs are in the form of teeth facing the circular plate.

8. A unit according to claim 1, wherein a length of the expansion element is smaller than a length of the locating sleeve, wherein an expansion zone of the locating sleeve is longer than the length of the threaded sleeve.

9. A unit according to claim 1, wherein teeth front sharp edges are formed from the inner side.

10. A unit according to claim 1, wherein the sleeve with an outer thread has an outer diameter with gradation from the side of the expansion element and said diameters are adapted to the inner diameters of the locating sleeve.

11. The unit according to claim 1 wherein said expansion element comprises a screw.

* * * * *